March 21, 1933.  H. F. CLARK  1,901,896
GLASS DRAWING APPARATUS
Filed May 19, 1930  2 Sheets-Sheet 1

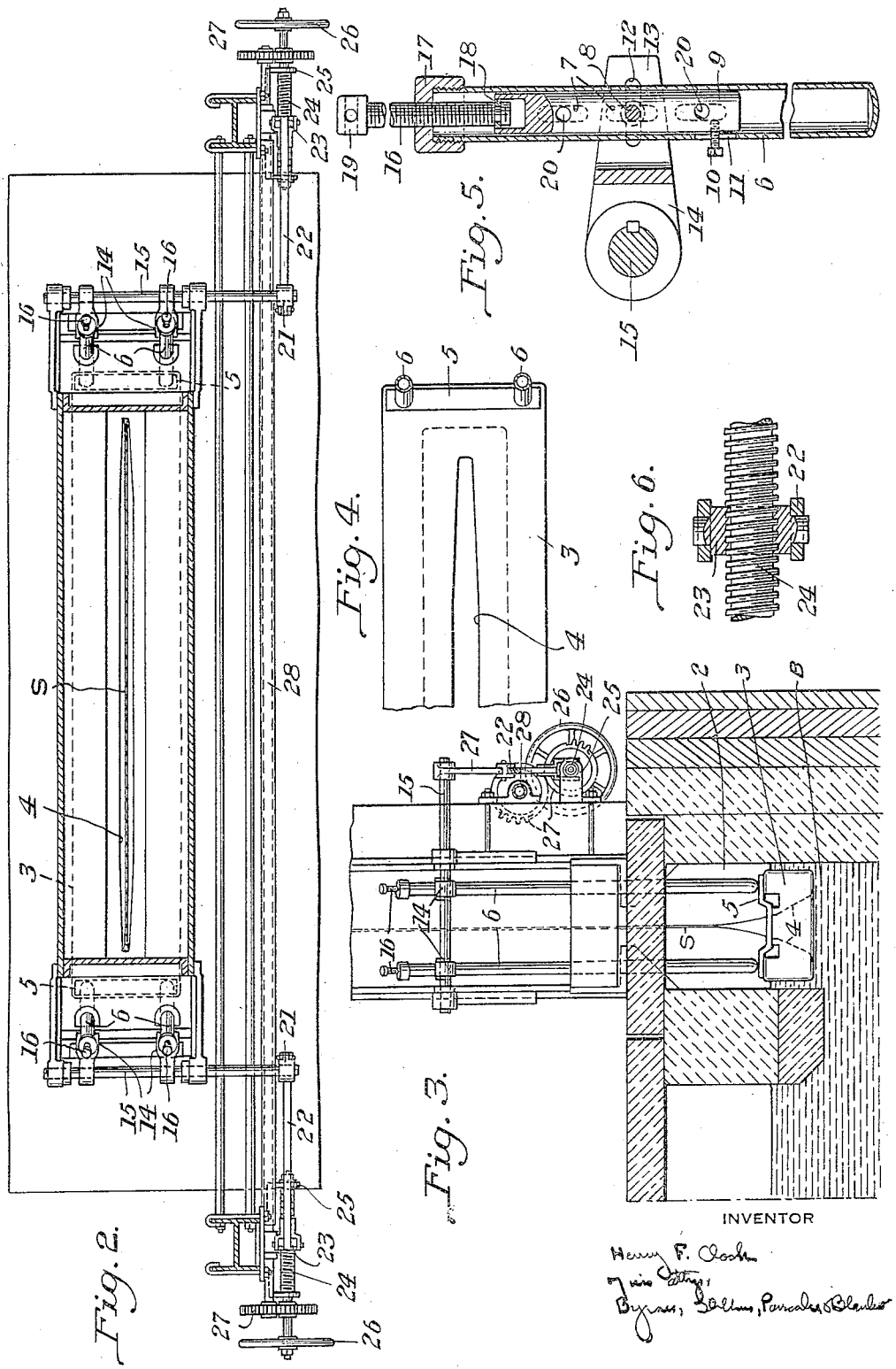

Patented Mar. 21, 1933

1,901,896

UNITED STATES PATENT OFFICE

HENRY F. CLARK, OF NEW KENSINGTON, PENNSYLVANIA, ASSIGNOR TO AMERICAN WINDOW GLASS COMPANY, OF PITTSBURGH, PENNSYLVANIA, A CORPORATION OF PENNSYLVANIA

GLASS DRAWING APPARATUS

Application filed May 19, 1930. Serial No. 453,556.

This invention relates to glass drawing apparatus, and particularly to an apparatus for use in those glass drawing processes employing a so-called floater or debiteuse; for example, the Fourcault process.

In the Fourcault process a slotted clay floater is depressed in a bath of molten glass to such degree that the glass wells upwardly through the slot and is drawn off in sheet form. It is very important that the floater be submerged the proper amount, and provision is usually made for engaging the same at the ends so as to press it downwardly. The floaters are made of clay and are subject to slight irregularities or warpage. For this reason the usual form of depressing apparatus often proves unsatisfactory in that the floater is not depressed the same amount at different corners, or, because of some other irregularity, is not as nicely positioned as desired. I provide a plurality of depressing devices, one or more of which are individually adjustable. Provision is also made for simultaneously adjusting them, and by this latter means the general submergence of the floater is determined. However, if occasion arises, the depressing devices may be individually adjusted so as to position the floater in such manner as to insure the best results.

In the accompanying drawings, illustrating the present preferred embodiment of the invention, Figure 1 is a transverse section through a drawing chamber, the floater and the depressing device being shown in side elevation;

Figure 2 is a horizontal section taken on the line II—II of Figure 1;

Figure 3 is a longitudinal section on the line III—III of Figure 1;

Figure 4 is a top plan view of one end portion of a floater showing the engagement thereof by the depressing device;

Figure 5 is a longitudinal section through one of the posts employed for depressing the floater; and Figure 6 is a detail view of a connection employed for adjusting the posts.

Figure 1:
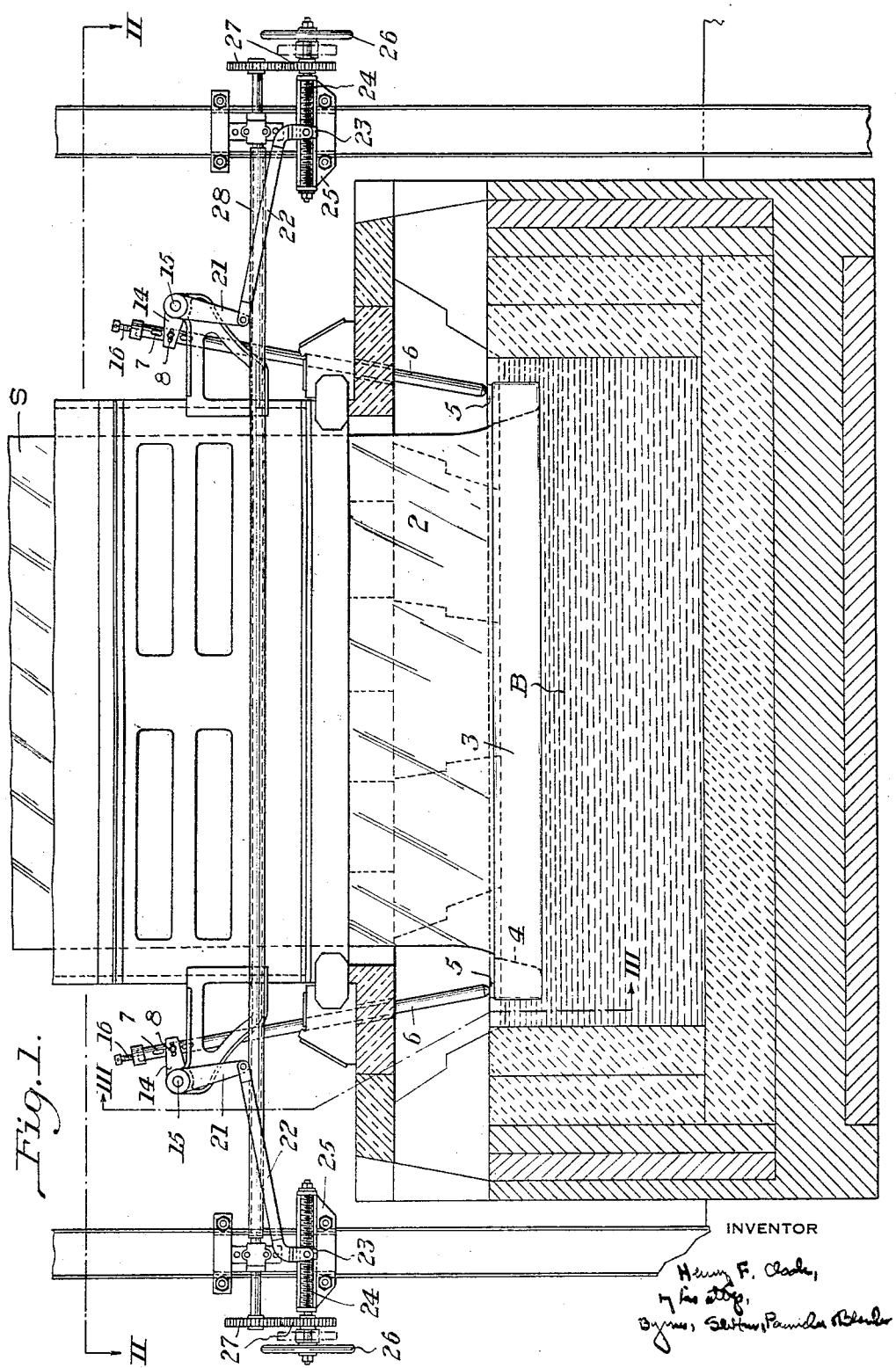

Referring to the drawings, there is shown a glass drawing chamber indicated generally by the reference character 2, the bottom portion of which contains a bath B of molten glass having a floater 3 therein. The floater has a slot 4 through which the molten glass wells upwardly and is drawn off in the form of a sheet S by draft rollers, not shown.

A bearing plate 5 is provided on each end of the floater and each bearing plate is engaged by two posts 6. The posts 6 are hollow and are slidable in the metal framework of the machine, as best shown in Figures 1 and 2. At their upper ends they are provided with a plurality of slots 7, any one of which may receive a cross pin 8.

The cross pin 8 extends through a block 9 which is slidable in the post 6, the degree of movement being limited by a screw 10 working in a slot 11. The cross pin 8 extends through slots 12 in the arms 13 of a yoke lever 14 on a shaft 15. The block 9 is normally held in fixed position relative to the post 6 by means of a screw 16 threaded in a cap 17 on the post and having a slotted lower end engaged by a washer 18 which is welded to the top of the block 9. There is a shaft 15 for each side of the machine, and it will be apparent that the rocking of these shafts will be effective for raising or lowering the posts 6 and thus determining the degree of submergence of the floater 3. In addition, the several screws 16 may be individually turned, thus effecting an individual adjustment of each of the posts 6. Each screw 16 is provided with a capstan head 19 for purposes of adjustment.

The several slots 7 are provided, and registering holes 20 are formed in the block 9, so that the cross pin 8 may be positioned in any of such holes, thus giving a wide range of adjustment.

Each shaft 15 carries an arm 21 connected to a link 22. Each link 22 is yoked at one end to accommodate a nut 23 trunnioned in the yoke, as best shown in Figure 6. Each nut 23 is threaded on a screw 24 rotatable in a bracket 25. Each screw is provided with a handwheel 26, and the two screws are connected together through gears 27 and a cross shaft 28. Rotation of either handwheel 26 is effective for simultaneously and equally rotating the two screws 24 and effecting a general upward or downward movement of the several posts 6. If it is desired to depress one corner of the floater a little more than another corner, the screws 16 are individually adjusted to obtain the desired result. The screw form of adjustment is very desirable for this purpose as very delicate settings may be made.

I have illustrated and described a present preferred embodiment of the invention. It will be understood, however, that it is not limited to the form shown but may be otherwise embodied or practiced within the scope of the following claims.

I claim:

1. Apparatus for depressing a floater for glass drawing comprising a post, a relatively slidable block, means for adjusting the position of the block relative to the post, and depressing means connected to the block.

2. Apparatus for depressing a floater for glass drawing comprising a post, a relatively slidable block, screw means for adjusting the position of the block relative to the post, and depressing means connected to the block.

3. Apparatus for depressing a floater for glass drawing comprising a plurality of posts adapted to engage the floater, a shaft, means connecting the shaft to the post, means for rotating the shaft, whereby the posts may be adjusted equally and simultaneously, and means for individually adjusting at least one of said posts.

4. Glass drawing apparatus comprising a drawing chamber, a floater therein, a plurality of posts extending into the drawing chamber at each end thereof and engaging the floater, means connecting the posts into groups, separate means for each group for equally and simultaneously adjusting the posts in each group, and means for individually adjusting at least one of said posts.

5. Glass drawing apparatus comprising a drawing chamber, a floater therein, a plurality of posts extending into the drawing chamber at each end thereof and engaging the floater, means connecting the posts into groups, separate means for each group for equally and simultaneously adjusting the posts in each group, and screw means for individually adjusting the effective length of each post.

6. In combination with a floater for glass drawing, a plurality of depressing devices, means for equally and simultaneously adjusting the several depressing devices in a vertically extending direction, and means for individually adjusting at least one of said depressing devices.

7. In combination with a floater for glass drawing, a plurality of posts for depressing the floater, depressing means for equally and simultaneously adjusting the several posts in a vertically extending direction, and means for individually adjusting at least one of said posts comprising a block slidable relatively to the post, and means for adjusting the position of the block relative to the post, the aforesaid depressing means being connected to the block.

In testimony whereof I have hereunto set my hand.

HENRY F. CLARK.